Sept. 22, 1931.   H. SCHLAICH   1,824,372
INDICATING DEVICE RESPONSIVE TO TEMPERATURE AND
PRESSURE FOR INTERNAL COMBUSTION ENGINES
Filed Dec. 20, 1928
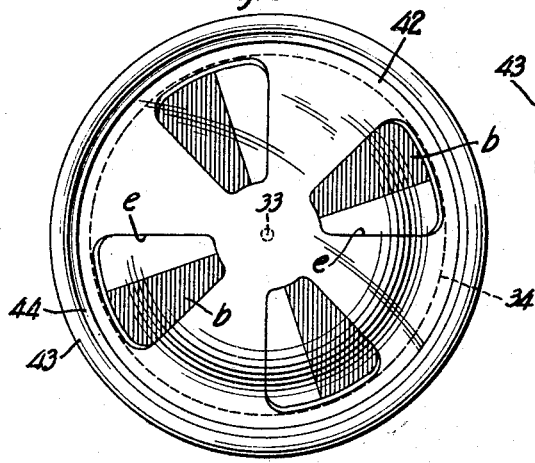
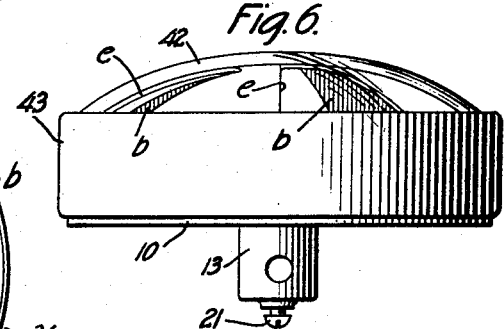
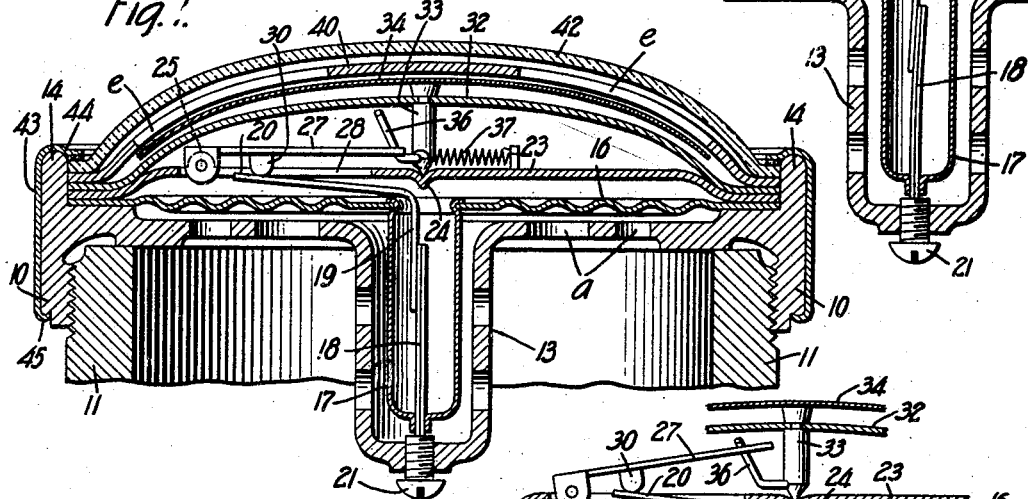
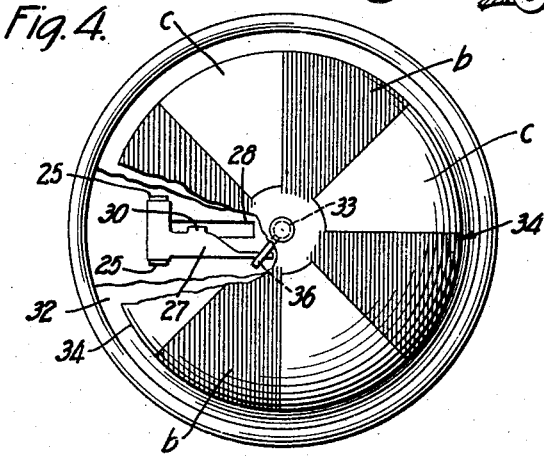
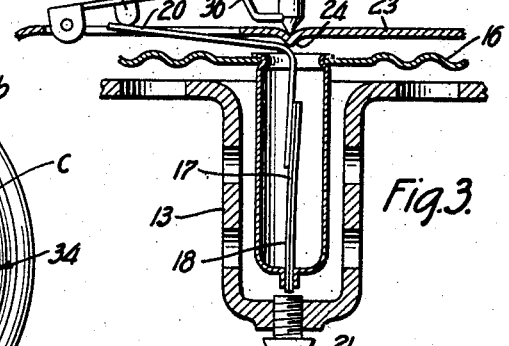
INVENTOR
Herman Schlaich
BY Moses & Nolte
ATTORNEYS Patented Sept. 22, 1931

1,824,372

UNITED STATES PATENT OFFICE

HERMAN SCHLAICH, OF LONG ISLAND CITY, NEW YORK

INDICATING DEVICE RESPONSIVE TO TEMPERATURE AND PRESSURE FOR INTERNAL COMBUSTION ENGINES

Application filed December 20, 1928. Serial No. 327,448.

My present invention relates to improvements in instruments for indicating the thermal condition of the cooling system of an internal combustion engine and is of particular value in connection with automotive vehicles. In general it is the object of my invention to provide such an instrument which will have an indicating member which is actuated both by temperature and by pressure effects within the cooling system whereby, for example, the indicating member is actuated by a temperature effect to show temperature conditions therein and is further actuated to show a condition of more or less active boiling of the cooling liquid by the effect of the vapor pressure of such liquid. A more specific object is to provide such an instrument mounted on or within a radiator cap.

It is a further object of my invention to provide such an instrument which will be of simple and durable construction and of ease of manufacture. Other objects and advantages of my invention will be apparent as the description proceeds and the features of novelty will be pointed out in the appended claims.

For a complete understanding of my invention reference may now be had to the following detailed description taken with the annexed drawing in which:

Figure 1 is a view in vertical section of an illustrative embodiment, the same being shown applied to a radiator cap;

Figures 2 and 3 are similar views showing the operation of the device;

Figure 4 is a plan view with the cover glass and stationary dial removed and showing the arrangement of some of the actuating mechanism; and Figures 5 and 6 are respectively plan and elevational views of the assembled instrument with the indicator shown a little beyond its half-way position.

In the drawings, 10 denotes the frame or body portion of the instrument which also carries an internally threaded portion adapted to engage the threads of the filling spout 11 of the automobile radiator. Said frame 10 which contains several perforations *a* to permit pressure to be transmitted therethrough has a centrally disposed well portion 13 for containing the actuating mechanism and an upstanding portion 14 for holding the dials, cover glass, and other members as will be described. Mounted in frame 10 is a diaphragm 16 which in the embodiment shown is provided with a centrally disposed thimble 17 of thin heat-conducting metal which depends into the well 13. The lower extremity of thimble 17 contains an actuating rod comprising a portion 18 of thermostatic metal rigidly secured to said extremity and a non-thermostatic portion 19 having an approximately right angled bend therein as shown in Figures 1 to 3. It will be evident from the description thus far that the effect of excess of temperature alone would be to bend said thermostatic portion as shown in Figures 2 and 3, thereby elevating the remote end portion 20 of composite rod 18, 19, whereas the effect of an excess of pressure in the space surrounding well 13 would cause the diaphragm 16 to move upwardly and also to move said rod 18, 19 which is carried therewith. The effects of temperature and pressure are thus additive, as measured by the upward movement of the extremity 20. For the purpose of adjustment, well 13 is provided with a screw 21 on which the thimble 17 rests whereby the initial position of said thimble and consequently that of the extremity 20 of said rod may be varied.

Movement of the extremity 20 is caused to actuate a revoluble dial as follows: Above diaphragm 16 is a lower bearing plate 23 having a central cusp 24 to serve as one bearing for the spindle of a revoluble dial to be described, said plate also having ears 25, 25 in which an actuating lever 27 is pivoted. Plate 23 also has a cut-out portion 28 to accommodate the rod portion 19 while lever 27 has a bearing portion 30 contacting with the extremity 20 of composite rod 18, 19. Frame 10 also contains above said lower bearing plate 23, and upper bearing plate 32 centrally apertured to contain a spindle 33 extending into cusp 24 of plate 23, spindle 33 having attached thereto movable dial or indicating member 34. The indicating member which is clearly shown in Fig. 4 has markings $b$ preferably red and of sector shape leaving portions $c$ uncolored or of a color different from portions $b$ as may be desired. The spindle 33 is provided with a pin 36 bearing upon lever 27 and extending outwardly and upwardly from said spindle such that when said lever is elevated, it causes, by its engagement with said pin, spindle 33 carrying dial 34 to rotate. In order that pin 36 may be kept in contact with lever 27, a spring 37 is attached to said pin and to bearing plate 23, and by its tension urges the dial to assume its initial position.

Above movable dial 34 a stationary dial 40 is provided having cut-out portions $e$, the parts being arranged so that portions $e$ register with the red portions $b$ of the movable dial when the latter is in normal or non-actuated position. The instrument is completed by a cover glass 42 and the various parts above frame 10 are held in place by means of a band 43 of springy metal having inwardly extending portions 44, 45, the lower of which, 45, engages a recessed portion in frame 10 while portion 44 engages through suitable packing, the cover glass 42 and thus holds the various elements mentioned securely in place.

In use, the temperature actuation will ordinarily indicate the approximate temperature of the cooling liquid and since there is always a lag between the temperature of the liquid and that of the air space above it, there will be a sudden rise of the temperature when boiling takes place, such sudden rise serving as a warning to the operator of the overheated condition of the cooling system. As the instrument is adjusted however, the temperature effect, even of boiling, will not be sufficient to move the indicator for its entire movement. When, however, the condition of overheating is sufficient for the liquid to boil vigorously enough to generate a slight excess pressure (which will occur due to the fact that the overflow pipe connecting the air space of the radiator with the outside will be of insufficient capacity to prevent such excess pressure from building up) such excess of pressure will actuate the diaphragm to move the indicator for, say, its entire movement or until the spaces $e$ of the dial 40 are completely covered by the red portions $b$ of indicator 34.

It is an advantage of my improved instrument that the same maximum position of the indicator is had regardless of summer or winter conditions. Where only the temperature effect is indicated as in the ordinary radiator cap thermometer, the maximum indication may be quite different in winter than in summer due to the fact that in winter it is common to employ a low boiling antifreeze ingredient in the cooling liquid as for example ethyl alcohol, in which case the temperature of the air space around the temperature responsive device, will upon boiling of the liquid, be approximately 20° C. below that indicated by water alone and therefore the maximum indication for boiling of the cooling liquid in winter may not be substantially above the normal upper range of summer driving (which is more nearly equal to that of the cooling liquid in the radiator) so that the operator accustomed to summer driving may mistake an indication of boiling in winter for that of normal summer driving. However, due to the additional actuation by the pressure effect, the indicator, assuming conditions warrant it, will always give the same maximum indication regardless of the atmospheric temperature.

It will be seen that I have provided a unitary instrument having a single indicating member which is responsive both to temperature and pressure effects in the cooling system whereby first one and then the other of these effects are indicated. It will also be evident that the principle of having a single indicating member actuated by both temperature and pressure effects may be applied to instruments other than a radiator cap instrument and it is my intention to claim my invention broadly to cover such other arrangement. It will, furthermore, be understood that various changes may be made in the specific embodiment described and parts thereof may be used without others without departing from the spirit of my invention or the scope of the appended claims.

The present invention is to be regarded as a further development of the invention described and claimed in my co-pending application, Serial No. 253,946, filed February 13, 1928, for combined temperature and danger indicating means.

What I claim is:

1. In a device for indicating thermal conditions in the cooling system of an internal combustion engine, an indicator proper having a movable indicating member in combination with means responsive to temperature conditions in said cooling system for giving said member a portion only of its indicating movement and means responsive to pressure conditions in said system for giving said member a further portion of its indicating movement.

2. In a device for indicating thermal conditions in the cooling system of an internal combustion engine, an indicator proper comprising a dial having a sight opening therein, a movable indicating member visible therethrough, in combination with means responsive to temperature conditions in said cooling system for giving said member a portion only of its indicating movement and means responsive to pressure conditions in said system for giving said member a further portion of this indicating movement.

3. In an indicating device responsive to both heat and pressure effects, a movable indicating member, a pressure responsive element, a temperature responsive element, means joining said elements together such that the actions of such elements are additive, and motion transmitting means connecting said joined elements and said movable indicating member.

4. In an indicating device responsive to both temperature and pressure effects, a movable indicating member, a pressure responsive element, a temperature responsive element joined thereto, the arrangement of parts being such that motion of said pressure responsive element is transmitted through said temperature responsive element, and motion transmitting means connecting said temperature responsive element and said movable element.

5. In an indicating device responsive to both temperature and pressure effects, a movable indicating member, a pressure responsive element, a temperature responsive element joined thereto, the arrangement of parts being such that motion of said pressure responsive element, is transmitted through said temperature responsive element, motion transmitting means connecting said temperature responsive element and said movable element, and means for adjusting the initial position of said diaphragm.

6. In a device according to claim 3 in which the temperature responsive means is part of the motion transmitting means.

7. In an indicating device responsive to both temperature and pressure effects, a frame adapted to serve as a cap for the filling spout of an automobile radiator. said frame also having a bore depending into said radiator spout, a diaphragm carried by said frame and having a portion closed to the atmosphere extending into said depending frame portion, a temperature responsive element in the form of a bi-metallic strip attached to said closed portion of said diaphragm, a movable indicating member and motion transmitting means connecting said temperature responsive element with said movable member.

8. In an indicating device responsive to both temperature and pressure effects, a frame adapted to serve as a cap for the filling spout of an automobile radiator, said frame also having a bore depending into said radiator spout, a daphragm carried by said frame and having a portion closed to the atmosphere extending into said depending frame portion, a temperature responsive element in the form of a bi-metallic strip attached to said closed portion of said diaphragm, a movable indicating member in the form of a rotatable dial, means for pivoting same in said frame, and motion transmitting means connecting said temperature responsive element with said movable member.

9. In a device for indicating thermal conditions in the cooling system of an internal combustion engine, an indicator proper having a movable indicating member in combination with means responsive to temperature conditions in said cooling system to move said member to show the temperature in said system and pressure responsive means in said system for actuating said member to give upon a condition of excess pressure a quick movement of said member in the direction of greater temperature.

10. In a device for indicating thermal conditions in the cooling system of an internal combustion engine, an indicator proper, means for actuating same adapted to respond progressively to changes in temperature in said cooling system and means also for actuating said indicator proper adapted to respond to changes in pressure in said cooling system.

11. A radiator cap for the cooling system of an internal combustion engine adapted for automotive use, said cap bearing means for giving an indication in response to progressive temperature changes within the radiator, together with means for giving an indication in response to pressure conditions within said radiator.

12. In combination with a radiator cap for a cooling system of an internal combustion engine adapted for automotive use, a visual indicator mounted in said cap for indicating the thermal conditions of said cooling system, together with means for actuating said indicator responsive both to temperature and pressure conditions within said cooling system.

13. In an indicating device responsive to both temperature and pressure effects, a movable indicator member, a pressure responsive element, means for operatively connecting same with said indicating member and a temperature responsive element mounted upon said pressure responsive element whereby the actuation of the pressure responsive element is added to that of the temperature responsive element.

In testimony whereof I have affixed my signature to this specification.

HERMAN SCHLAICH.